United States Patent
Lee et al.

(10) Patent No.: US 8,195,174 B2
(45) Date of Patent: Jun. 5, 2012

(54) APPARATUS AND METHOD FOR ALLOCATING FREQUENCY RESOURCE IN A COMMUNICATION SYSTEM

(75) Inventors: Joo-Hyun Lee, Suwon-si (KR); Sang-Boh Yun, Seongnam-si (KR); Jong-Hyeuk Lee, Anyang-si (KR); Dae-Sik Hong, Seoul (KR); Tae-Hoon Kwon, Seoul (KR)

(73) Assignees: Samsung Electronics Co., Ltd, Suwon-si (KR); Industry-Academic Cooperation Foundation, Yonsei University, Seoul (KR)

( * ) Notice: Subject to any disclaimer, the term of this patent is extended or adjusted under 35 U.S.C. 154(b) by 1098 days.

(21) Appl. No.: 12/061,993

(22) Filed: Apr. 3, 2008

(65) Prior Publication Data

US 2008/0248803 A1  Oct. 9, 2008

(30) Foreign Application Priority Data

Apr. 3, 2007  (KR) .................. 10-2007-0032992

(51) Int. Cl.
*H04W 72/00* (2009.01)
(52) U.S. Cl. .............. 455/450; 455/456.1; 455/509; 455/446; 455/447; 370/329; 370/341
(58) Field of Classification Search ........ 455/63.1–63.4, 455/509, 446–447, 456.1, 442, 158.1, 166.2, 455/179.1, 434, 450; 370/208, 480, 329–330, 370/341, 436–437, 431
See application file for complete search history.

(56) References Cited

U.S. PATENT DOCUMENTS

| 5,758,090 A | 5/1998 | Doner |
| 2004/0097238 A1 | 5/2004 | Hwang et al. |
| 2005/0202784 A1* | 9/2005 | Xu et al. .................. 455/63.3 |
| 2006/0205412 A1 | 9/2006 | Oh et al. |

FOREIGN PATENT DOCUMENTS

| JP | 05-110504 A | 4/1993 |
| KR | 10-2004-0041009 A | 5/2004 |
| KR | 10-2006-0097450 A | 9/2006 |

* cited by examiner

*Primary Examiner* — Wayne Cai
(74) *Attorney, Agent, or Firm* — Jefferson IP Law, LLP

(57) ABSTRACT

A method and apparatus for allocating resources for a mobile station in a communication system is provided. The method includes determining if a mobile station within a cell is located in one of a first region corresponding to a cell center, a third region corresponding to a cell edge, and a second region corresponding to an area between the first and third regions, allocating frequency resources within an entire frequency band to the mobile station when the mobile station is located in the first region, wherein the entire frequency band comprises at least a first frequency band and a second frequency band, allocating frequency resources within the first frequency band to the mobile station when the mobile station is located in the third region, and allocating frequency resources within the second frequency band to the mobile station when the mobile station is located in the second region.

20 Claims, 9 Drawing Sheets

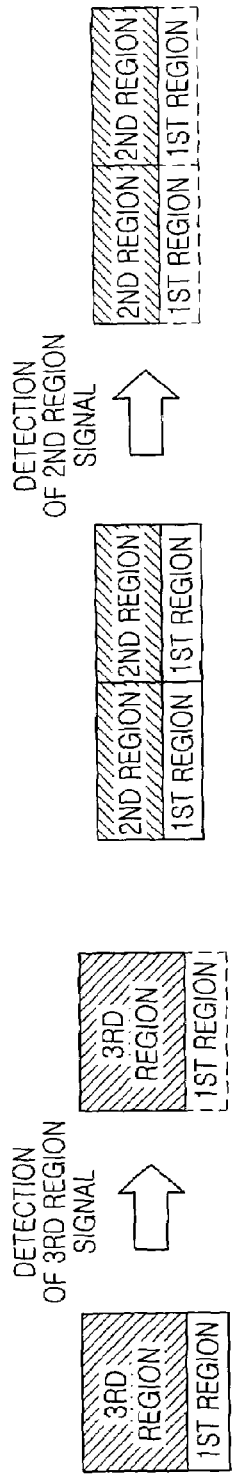
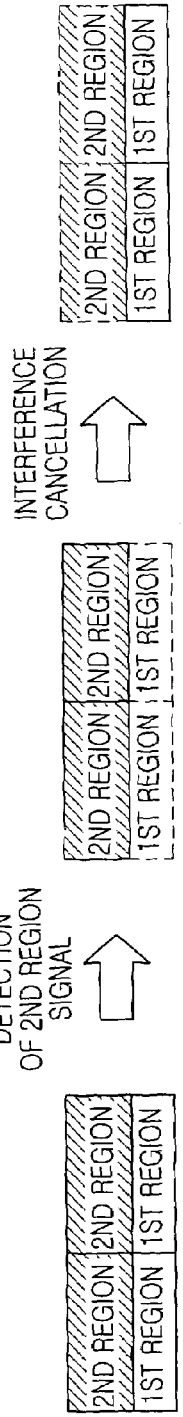
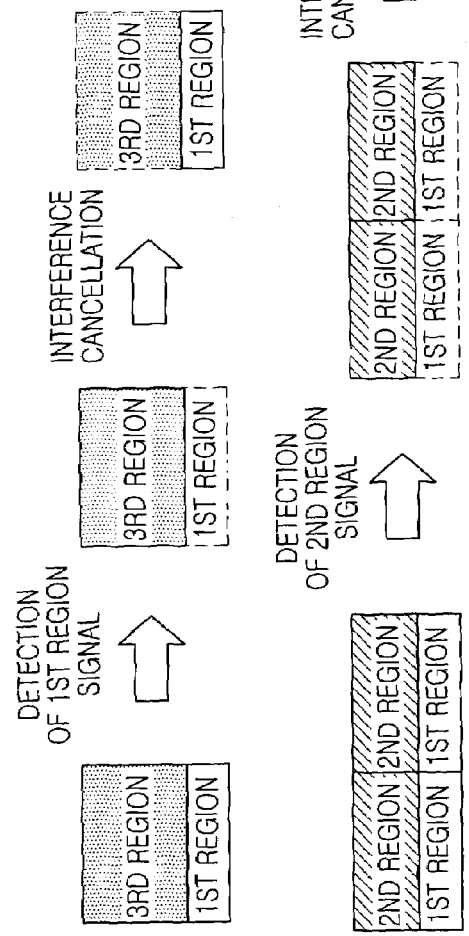
FIG.5A
FIG.5B
FIG.5C

APPARATUS AND METHOD FOR ALLOCATING FREQUENCY RESOURCE IN A COMMUNICATION SYSTEM

PRIORITY

This application claims the benefit under 35 U.S.C. §119(a) of a Korean patent application filed in the Korean Intellectual Property Office on Apr. 3, 2007 and assigned Serial No. 2007-32992, the entire disclosure of which is hereby incorporated by reference.

JOINT RESEARCH AGREEMENT

The presently claimed invention was made by or on behalf of the below listed parties to a joint research agreement. The joint research agreement was in effect on or before the date the claimed invention was made and the claimed invention was made as a result of activities undertaken within the scope of the joint research agreement. The parties to the joint research agreement are Samsung Electronics Co., Ltd. and the Industry-Academic Cooperation Foundation, Yonsei University.

BACKGROUND OF THE INVENTION

1. Field of the Invention

The present invention relates to a communication system. More particularly, the present invention relates to an apparatus and method for allocating frequency resources in a communication system.

2. Description of the Related Art

Next generation communication systems are evolving with an emphasis on providing mobile stations (MSs) with services capable of transmitting/receiving large amounts of data at high speed.

One type of a next generation communication system is a communication system having a cellular structure (hereinafter, referred to as a "cellular communication system"). Cellular communication systems include a plurality of cells to which limited resources, such as frequency resources, code resources, and time slot resources, are distributed. The use of the limited resources in the cells may result in inter-cell interference (ICI). Two conventional methods for canceling the ICI include an interference cancellation scheme and a cell planning scheme.

In the interference cancellation scheme ICI is canceled after the ICI has occurred. Implementation of the interference cancellation scheme in a cellular communication system is difficult due to its complexity and the need for information, such as channel information of adjacent cells. In contrast, the cell planning scheme is comparatively easier to implement. In the cell planning scheme frequency resources are used in cells according to a plan that was made in advance to prevent ICI from occurring. As a result of the cell planning scheme being easier to implement, cellular communication systems tend to use the cell planning scheme.

The cell planning scheme includes a reuse partitioning (RP) scheme and a soft frequency reuse (SFR) scheme.

An example of resources being allocated using the reuse partitioning scheme in a conventional communication system will be described with reference to FIG. 1.

Referring to FIG. 1, according to the reuse partitioning scheme, when a communication system includes three cells, i.e. cell A 110, cell B 120, and cell C 130, the cells 110, 120 and 130 are divided into first regions 111, 121 and 131 and second regions 113, 123 and 133, respectively, according to distances from the respective base stations. The first regions 111, 121 and 131 correspond to centers of the cells, and the second regions 113, 123 and 133 correspond to edges of the cells. MSs located in the first regions 111, 121 and 131 are allocated the same frequency band, i.e. band #1, and MSs located in the second regions 113, 123 and 133 are allocated mutually different frequency bands, i.e. band #2, band #3 and band #4, respectively, depending on the cell.

Accordingly, since the MSs located in the second regions 113, 123 and 133 encounter a stronger ICI, i.e. experience a smaller signal-to-interference-plus-noise ratio (SINR), as compared to the MSs located in the first regions 111, 121 and 131, the MSs located in the second regions are allocated mutually different frequency bands, thereby reducing the strength of the ICI in the second regions. In addition, although the MSs located in first regions 111, 121 and 131 encounter a weaker ICI, i.e. experience a larger SINR, as compared to the MSs located in the second regions, the MSs located in the first regions are allocated the same frequency band, thereby reducing the strength of the ICI in the first regions on account of power attenuation being dependent on distance. However, according to the reuse partitioning scheme, since cell A 110 is allocated bands #1 and #2 among all of the frequency bands, cell B 120 is allocated bands #1 and #3, and cell C 130 is allocated bands #1 and #4, efficiency is low in terms of resource utilization.

FIG. 2 is a view illustrating an example of resources being allocated according to the soft frequency reuse scheme in a conventional communication system.

According to the soft frequency reuse scheme, when a communication system includes three cells, i.e. cell A 210, cell B 220, and cell C 230, the cells 210, 220 and 230 are divided into first regions 211, 221 and 231 and second regions 213, 223 and 233, respectively, according to distances from the respective base stations. The first regions 211, 221 and 231 correspond to the centers of the cells, and the second regions 213, 223 and 233 correspond to edges of the cells. MSs located in the second regions 213, 223 and 233 are allocated mutually different frequency bands, i.e. band #1, band #2 and band #3, and relatively high power, and MSs located in each first region 211, 221 or 231 are allocated the same frequency band as those allocated to MSs located in the second regions 221 and 231, 231 and 211, or 213 and 223 of cells other than each corresponding cell, and relatively low power.

Accordingly, since the MSs located in the second regions 213, 223 and 233 encounter a stronger ICI, i.e. experience a smaller SINR, as compared to the MSs located in the first regions 211, 221 and 231, the MSs located in the second regions are allocated mutually different frequency bands, thereby the ICI becomes weaker in the second regions. In addition, although the MSs located in the first region 211, 221 and 231 of each cell encounter a weaker ICI, i.e. experience of larger SINR, as compared to the MSs located in the second regions 213, 223 and 233, the MSs located in the first regions are overlappingly allocated the same frequency bands as those pre-allocated to MSs located in the second regions of other cells, thereby the ICI becomes weaker in the first regions on account of power attenuation being dependent on distance.

Therefore, MSs located in cell A 210 can use band #1 in the second region 213 and bands #2 and #3 in the first region 211, MSs located in cell B 220 can use band #2 in the second region 223 and bands #1 and #3 in the first region 221, and MSs located in cell C 230 can use band #3 in the second region 233 and bands #1 and #2 in the first region 231. Thereby, the soft frequency reuse scheme provides a higher resource utilization than the reuse partitioning scheme. FIG. 2 illustrates the resource allocation operation for cell A 210 as an example, excluding the resource allocation operations for cell B 220 and cell C 230.

Meanwhile, a capacity for frequency use in a conventional communication system may be defined by Equation 1 below.

$$W\log_2(1+SINR) \approx \begin{pmatrix} (W*SINR)\log_2 e & (SINR \to 0) \\ W\log_2 SINR & (SINR \rangle 1) \end{pmatrix} \quad (1)$$

In Equation 1, "W" represents a bandwidth, and "SINR" represents a signal-to-interference-plus-noise ratio.

That is, the SINR exerts a great effect on capacity when the SINR is a small value, and the "W" exerts a great effect on capacity when SINR is a large value. Therefore, the soft frequency reuse scheme, where MSs located in the second regions of neighboring cells are overlappingly allocated pre-allocated frequency bands as expanded frequency bands, is more efficient in terms of capacity, as compared to the reuse partitioning scheme, where MSs located in the first region experience a relatively larger SINR than the second regions are allocated mutually different frequency bands.

The capacities resulting from the reuse partitioning scheme and soft frequency reuse scheme will now be comparatively described with reference to a graph illustrated in FIG. 3.

The first region of a cell has the highest capacity when the soft frequency reuse scheme is used. The soft frequency reuse scheme makes it possible to obtain a high gain in terms of bandwidth use efficiency despite having a poor performance in terms of SINR. Thus, as compared to the reuse partitioning scheme, the soft frequency reuse scheme exhibits superior performance in terms of capacity. Meanwhile, in the second region of a cell, despite the capacity obtained by the soft frequency reuse scheme being lower than that obtained by the reuse partitioning scheme at values below a preset noise level, a difference between the capacities is not substantial. Therefore, as a whole, a cell has higher performance in terms of capacity when the soft frequency reuse scheme is used.

As described above, using the soft frequency reuse scheme achieves a higher performance than using the soft frequency reuse scheme, in terms of capacity. However, in this case, since MSs located in the first region and MSs located in the second region within the same cell are allocated mutually different frequency bands, bandwidth use efficiency is low.

SUMMARY OF THE INVENTION

An aspect of the present invention is to address at least the above-mentioned problems and/or disadvantages and to provide at least the advantages described below. Accordingly, an aspect of the present invention is to provide an apparatus and method for allocating resources in a communication system, which can increase bandwidth use efficiency.

Another aspect of the present invention is to provide an apparatus and method for efficiently allocating frequency bands and allocating power to be applied to the frequency bands so as to increase bandwidth use efficiency in a communication system.

In accordance with an aspect of the present invention, a method for allocating resources by a base station in a communication system is provided. The method includes determining if a mobile station within a cell is located in one of a first region corresponding to a cell center, a third region corresponding to a cell edge, and a second region corresponding to an area between the first and third regions, allocating frequency resources within an entire frequency band to the mobile station when the mobile station is located in the first region, wherein the entire frequency band comprises at least a first frequency band and a second frequency band, allocating frequency resources within the first frequency band to the mobile station when the mobile station is located in the third region, and allocating frequency resources within the second frequency band to the mobile station when the mobile station is located in the second region.

In accordance with another aspect of the present invention, a method for allocating resources for a mobile station in a communication system is provided. The method includes determining if the mobile station is located in a first region corresponding to one of a cell center, a third region corresponding to a cell edge, and a second region corresponding to an area between the first and third regions, within a cell, receiving a signal from a base station through frequency resources allocated within an entire frequency band when the mobile station is located in the first region, wherein the entire frequency band comprises at least a first frequency band and a second frequency band, receiving a signal from the base station through frequency resources allocated within the first frequency band when the mobile station is located in the third region, and receiving a signal from the base station through frequency resources allocated within the second frequency band when the mobile station is located in the second region.

In accordance with still another aspect of the present invention, an apparatus for allocating resources in a communication system is provided. The apparatus includes a location searcher for determining if a mobile station within a cell is located in one of a first region corresponding to a cell center, a third region corresponding to a cell edge, and a second region corresponding to an area between the first and third regions, and a channel selector for allocating frequency resources within an entire frequency band to the mobile station when the mobile station is located in the first region, allocating frequency resources within a first frequency band to the mobile station when the mobile station is located in the third region, and allocating frequency resources within a second frequency band to the mobile station when the mobile station is located in the second region, wherein the entire frequency band comprises at least the first frequency band and the second frequency band.

In accordance with still another aspect of the present invention, an apparatus for allocating resources in a communication system is provided. The apparatus includes a controller for determining if the mobile station is located in one of a first region corresponding to a cell center, a third region corresponding to a cell edge, and a second region corresponding to an area between the first and third regions, within a cell, and a receiver for receiving a signal from a base station through frequency resources allocated within an entire frequency band when the mobile station is located in the first region, through frequency resources allocated within a first frequency band when the mobile station is located in the third region, and through frequency resources allocated within a second frequency band when the mobile station is located in the second region, wherein the entire frequency band comprises at least the first frequency band and the second frequency band.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following detailed description taken in conjunction with the accompanying drawings, in which:

FIGS. 5A to 5C are views illustrating signal detection by MSs in each region when the frequency reuse scheme is used in a communication system according to an exemplary embodiment of the present invention;

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention propose a resource allocation method and apparatus for increasing bandwidth use efficiency in a communication system. In particular, exemplary embodiments of the present invention propose an apparatus and method for allocating mutually different frequency bands depending on geographical regions within each of a plurality of cells and allocating transmission power to be applied to the frequency bands so as to increase bandwidth use efficiency in a communication system.

Figure 1:
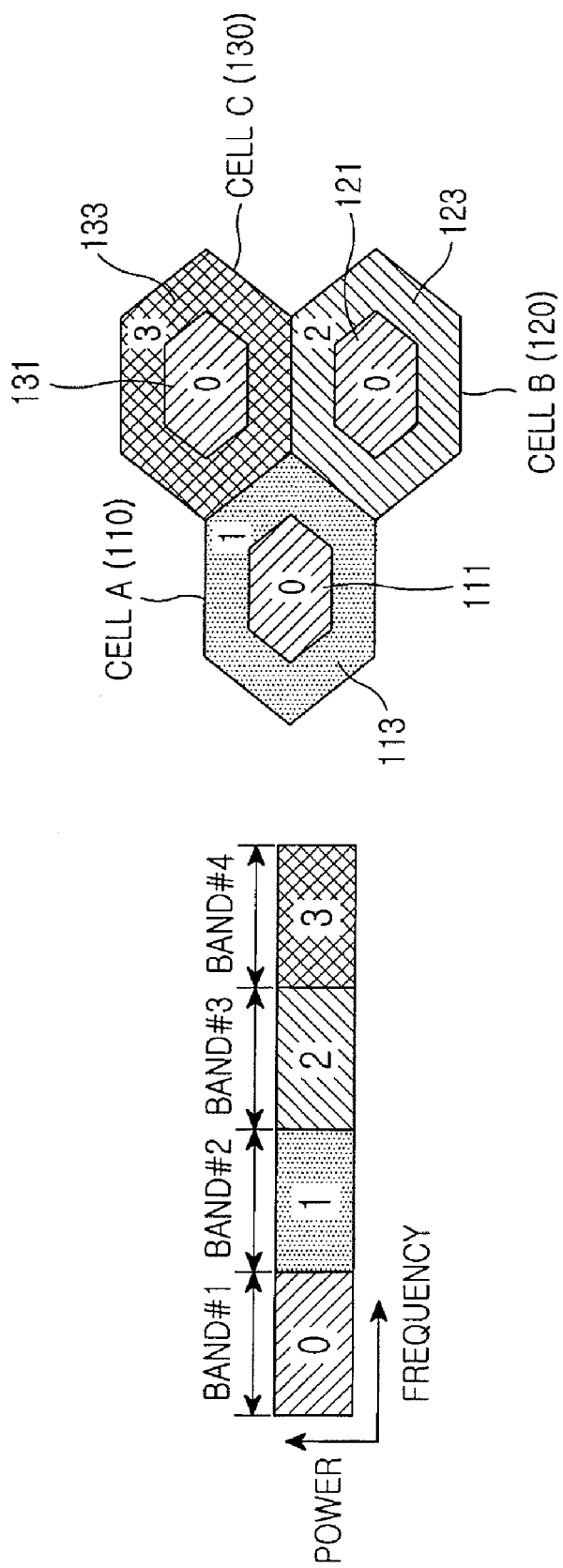
FIG. 1 is a view illustrating resource allocation when a reuse partitioning scheme is used in a conventional communication system.
Figure 2:
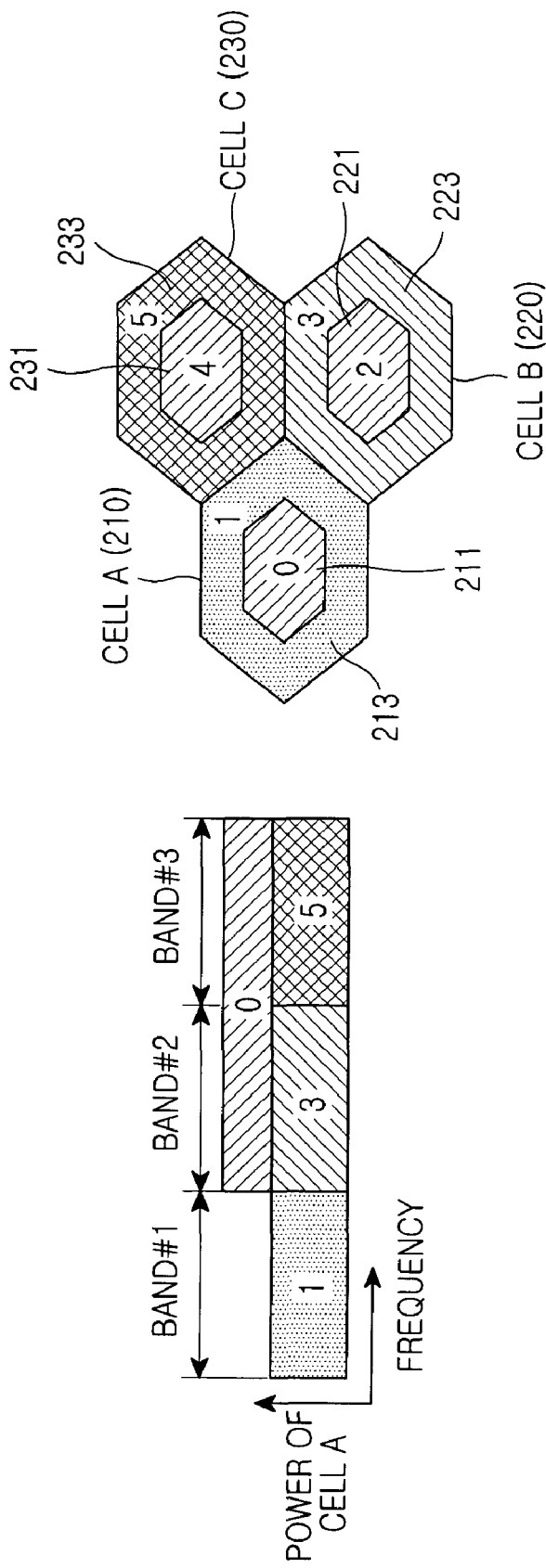
FIG. 2 is a view illustrating resource allocation when a soft frequency reuse scheme is used in a conventional communication system.
Figure 3:
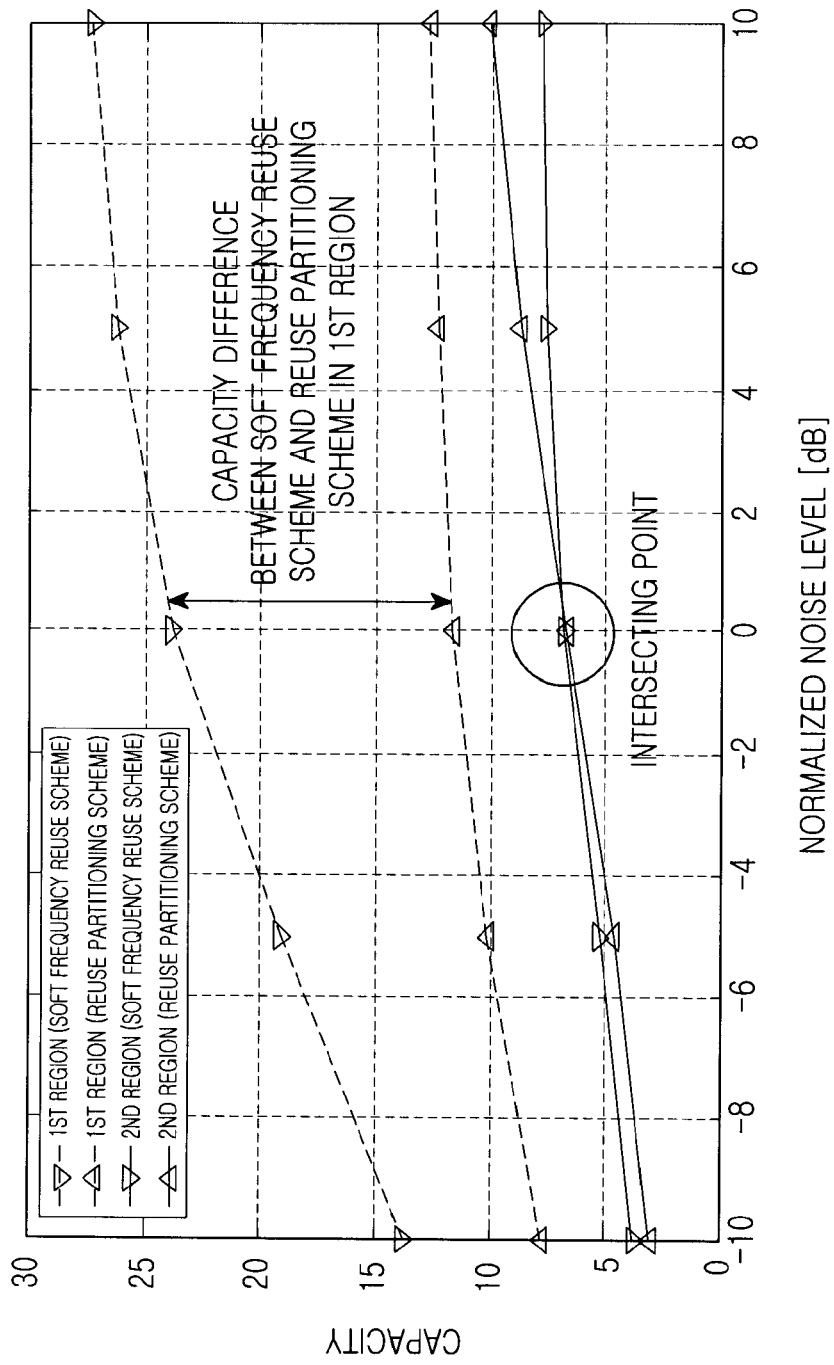
FIG. 3 is a graph illustrating a comparison between the conventional reuse partitioning scheme and the conventional soft frequency reuse scheme.
Figure 4:
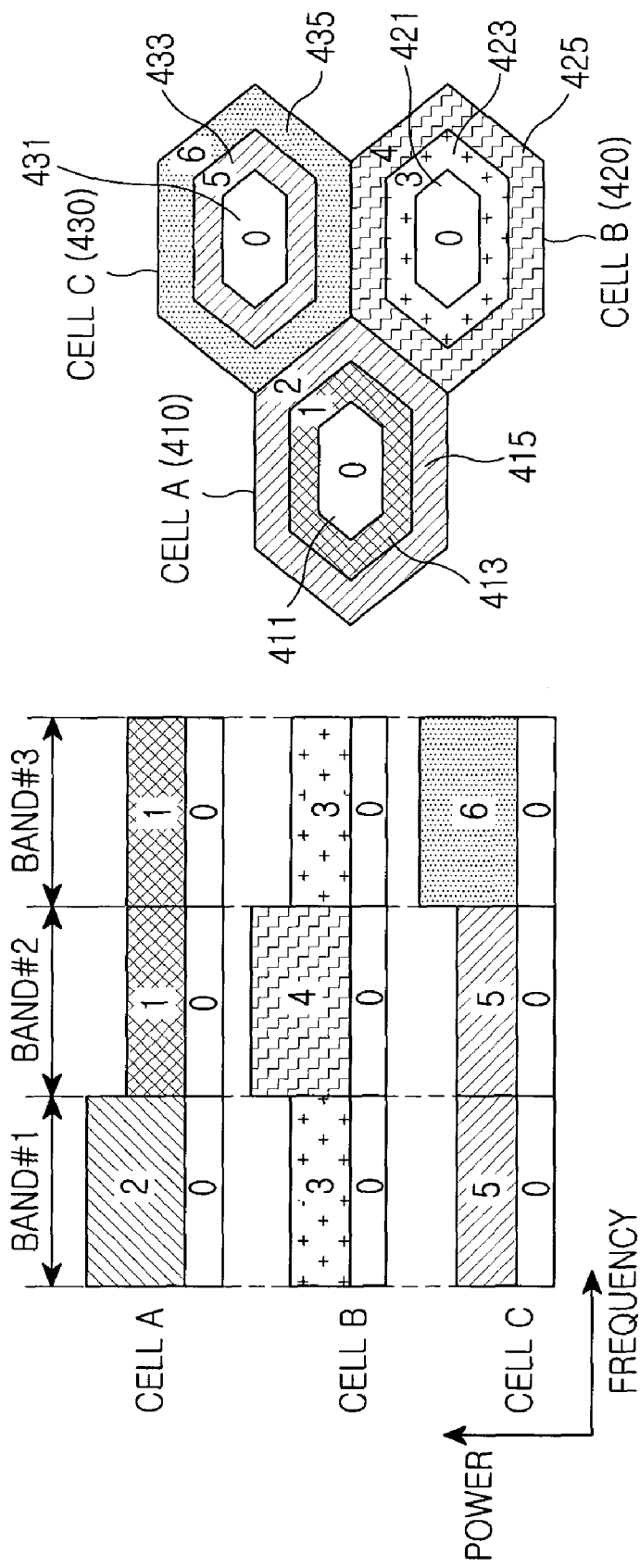
FIG. 4 is a view illustrating resource allocation using a frequency reuse scheme in a communication system according to an exemplary embodiment of the present invention.

FIG. 4 is a view illustrating resource allocation using a frequency reuse scheme in a communication system according to an exemplary embodiment of the present invention.

According to the frequency reuse scheme proposed by an exemplary embodiment of the present invention, when a communication system includes three cells, i.e. cell A 410, cell B 420, and cell C 430, each cell 410, 420 or 430 is partitioned into a first region 411, 421 or 431, a second region 413, 423 or 433, and a third region 415, 425 or 435 according to distances from each corresponding base station. The first regions 411, 421 and 431 correspond to centers of the cells, the third regions 415, 425 and 435 correspond to edges of the cells, and the second regions 413, 423 and 433 correspond to areas between the cell centers and the cell edges. Mobile stations (MSs) located in the third regions 415, 425 and 435, where a signal-to-interference-plus-noise ratio is the smallest among the regions 411 to 435, are allocated mutually different frequency bands according to the cell so that the SINR can increase, MSs located in the second regions 413, 423 and 433 are allocated the remaining frequency bands, except for the frequency bands allocated to MSs located in the third regions 415, 425 and 435, and MSs located in the first regions 411, 421 and 431 are allocated the frequency bands in their entirety. In addition, the MSs located in each region are allocated power, together with the frequency bands, in which a lower and lower amount of power is allocated in an order of the third regions, the second regions, and the first regions.

When there are three bands, i.e. bands #1, #2 and #3, available in the system, frequencies may be allocated as follows.

In cell A 410, MSs located in the third region 415 are allocated band #1 and the highest power, and MSs located in the second region 413 are allocated the remaining bands, i.e. bands #2 and #3, except for band #1, and relatively lower power. In addition, MSs located in the first region 411 are allocated the frequency bands in their entirety, i.e. bands #1, #2 and #3, and the remaining power obtained by subtracting the power allocated to the MSs located in the third region 415 and second region 413 from the total power allocated to cell A 410.

In cell B 420, MSs located in the third region 425 are allocated band #2 and the highest power, and MSs located in the second region 423 are allocated the remaining bands, i.e. bands #1 and #3, except for band #2, and relatively lower power. In addition, MSs located in the first region 421 are allocated the frequency bands, i.e. bands #1, #2 and #3, and the remaining power obtained by subtracting the power allocated to the MSs located in the third region 425 and second region 423 from the total power allocated to cell B 420.

In cell C 430, MSs located in the third region 435 are allocated band #3 and the highest power, and MSs located in the second region 433 are allocated the remaining bands, i.e. bands #1 and #2, except for band #3, and relatively lower power. In addition, MSs located in the first region 431 are allocated the frequency bands in their entirety, i.e. bands #1, #2 and #3, and the remaining power obtained by subtracting the power allocated to the MSs located in the third region 435 and second region 433 from the total power allocated to cell C 430.

The following description will be given about a method in which MSs located in each region, i.e. the first regions 411, 421 and 431, the second regions 413, 423 and 433, and the third regions 415, 425 and 435 within cell A 410, cell B 420 and cell C 430 detect a signal when the frequency reuse scheme is implemented in a communication system according to an exemplary embodiment of the present invention with reference to FIGS. 5A to 5C. Here, "a region signal" represents a signal received through a frequency band allocated to the region.

FIG. 5A illustrates a signal detection in a third region, FIG. 5B illustrates a signal detection in a second region, and FIG. 5C illustrates a signal detection in a first region.

As shown in FIG. 5A, upon detection of a third region signal, an MS regards a first region signal, which uses the same frequency band as a third region signal, as noise, and detects the third region signal. In this case, since power allocated for the third region is higher than power allocated for the first region, performance deterioration due to the first region signal is small, so that a separate detection procedure for the third region signal is not required.

As shown in FIG. 5B, upon detection of a second region signal, an MS regards a first region signal, which uses the same frequency band as a second region signal, as noise, and detects the second region signal. In this case, since power allocated for the second region is higher than power allocated for the first region, performance deterioration due to the first region signal is small, so that a separate detection procedure for the second region signal is not required.

Meanwhile, as shown in FIG. 5C, upon detection of a first region signal, an MS first detects second and third region signals, and cancels interference from all signals by using the detected signals, thereby detecting the first region signal. In this case, since the first region signal has a larger SINR than second and third region signals, the second and third region signals can be accurately detected without errors.

The capacities of the first, second and third regions may be defined by Equation 2 below.

$$C_{out} = \log_2\left(1 + \frac{(r_{out})^{-d} P_{out}}{(r_{out})^{-d} P_{in} + \sum_{i=1}^{6}(r_{out,i})^{-d}(P_{mid} + P_{in}) + \sigma^2}\right) \quad (2)$$

$$C_{mid} = \log_2\left(1 + \frac{(r_{mid})^{-d} P_{mid}}{(r_{mid})^{-d} P_{in} + \sum_{i=1,3,5} r_{mid,i}(P_{out} + P_{mid}) + \sum_{i=2,4,6} r_{mid,i}(P_{mid} + P_{in}) + \sigma^2}\right) +$$

$$\log_2\left(1 + \frac{(r_{mid})^{-d} P_{mid}}{(r_{mid})^{-d} P_{in} + \sum_{i=2,4,6} r_{mid,i}(P_{out} + P_{mid}) + \sum_{i=1,3,5} r_{mid,i}(P_{mid} + P_{in}) + \sigma^2}\right)$$

$$C_{in} = \log_2\left(1 + \frac{(r_{in})^{-d} P_{in}}{(r_{in})^{-d} \varepsilon_{out} + \sum_{i=1}^{6} r_{in,i}(P_{mid} + P_{in}) + \sigma^2}\right) +$$

$$\log_2\left(1 + \frac{(r_{in})^{-d} P_{in}}{(r_{in})^{-d} \varepsilon_{mid} + \sum_{i=1,3,5} r_{in,i}(P_{out} + P_{mid}) + \sum_{i=2,4,6} r_{in,i}(P_{mid} + P_{in}) + \sigma^2}\right) +$$

$$\log_2\left(1 + \frac{(r_{in})^{-d} P_{in}}{(r_{in})^{-d} \varepsilon_{mid} + \sum_{i=2,4,6} r_{in,i}(P_{out} + P_{mid}) + \sum_{i=1,3,5} r_{in,i}(P_{mid} + P_{in}) + \sigma^2}\right)$$

In Equation 2, "$C_{out}$" represents a capacity of a third region, "$C_{mid}$" represents a capacity of a second region, and "$C_{in}$" represents a capacity of a first region, wherein "out" is an index of the third region, "mid" is an index of the second region, and "in" is an index of the first region. Also, "$P_{out}$" represents power allocated to MSs located in the third region, "$P_{mid}$" represents power allocated to MSs located in the second region, and "$P_{in}$" represents power allocated to MSs located in the first region. Here, the power allocated to the MSs located in the first region corresponds to power obtained by subtracting a sum of the "$P_{out}$" and the "$P_{mid}$" from the total power allocated to a cell. Also, "$r_{out,i}$" represents a path loss of a signal which the MSs located in the third region has received from an $i^{th}$ adjacent cell, "$r_{mid,i}$" represents a path loss of a signal which the MSs located in the second region has received from an $i^{th}$ adjacent cell, and "$r_{in,i}$" represents a path loss of a signal which the MSs located in the first region has received from an $i^{th}$ adjacent cell. Also, "$\varepsilon_{out}$" represents an amount of interference of the first region which remains after an interference cancellation (IC) among the third region signal, and "$\varepsilon_{mid}$" represents an amount of interference of the first region which remains after an interference cancellation (IC) among the second region signal. Here, the "$\varepsilon_{out}$" and "$\varepsilon_{mid}$" may be defined by a modulation performance and an average amount of interference corresponding to the modulation performance. For example, when a binary phase shift keying (BPSK) modulation is used, the "$\varepsilon_{out}$" and "$\varepsilon_{mid}$" may be defined by Equation 3 below.

$$\varepsilon_{mid} = Q(2*SINR_{In,mid})*2*P_{mid}$$

$$\varepsilon_{out} = Q(2*SINR_{In,out})*2*P_{out} \quad (3)$$

In Equation 3, "$SINR_{In,mid}$" represents an SINR of the first and second regions, "$SINR_{In,out}$" represents an SINR of the first and third regions, "$P_{mid}$" represents power allocated to the MSs located in the second region, and "$P_{out}$" represents power allocated to the MSs located in the third region.

A path loss due to signals of adjacent cells of MSs in a communication system according to an exemplary embodiment of the present invention will now be described with reference to FIG. 6. In the following description, a cell including MSs, for which signals are subjected to a path loss due to signals from adjacent cells, is called a "central cell." In the following description, it is assumed that there is one central cell and six adjacent cells in the communication system. However, the present invention is equally applicable when there are more or less than six adjacent cells in the communication system. Also, FIG. 6 illustrates only one adjacent cell, i.e. an $i^{th}$ adjacent cell, among the assumed six adjacent cells.

Figure 6:
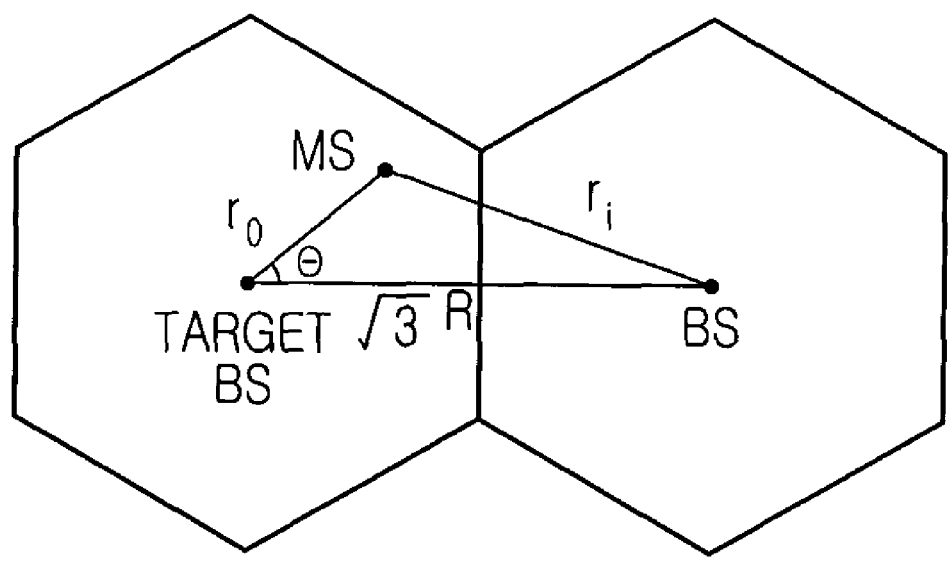
FIG. 6 is a view illustrating the path losses of signals which an MS receives from adjacent cells thereof in a communication system according to an exemplary embodiment of the present invention.

Referring to FIG. 6, "$r_0$" represents a path loss between an MS and a target BS controlling the central cell, "$\sqrt{3}R$" represents a path loss between the target BS and a BS of the $i^{th}$ adjacent cell, and "$r_i$" represents a path loss between the MS and the BS, i.e. a path loss of a signal which the MS has received from the $i^{th}$ adjacent cell. Here, the path losses "$r_i$" of signals which the MS has received from the adjacent cells are defined by Equation 4 below.

$$r_1^2 = r_0^2 + 3R^2 - 2r_0\sqrt{3}R \cos\theta$$

$$r_2^2 = r_0^2 + 3R^2 - 2r_0\sqrt{3}R \cos(60-\theta)$$

$$r_3^2 = r_0^2 + 3R^2 - 2r_0\sqrt{3}R \cos(120-\theta)$$

$$r_4^2 = r_0^2 + 3R^2 - 2r_0\sqrt{3}R \cos(180-\theta)$$

$$r_5^2 = r_0^2 + 3R^2 - 2r_0\sqrt{3}R \cos(120-\theta)$$

$$r_6^2 = r_0^2 + 3R^2 - 2r_0\sqrt{3}R \cos(60+\theta) \quad (4)$$

Meanwhile, power allocation according to each region may be defined by Equation 5 below.

$$\underset{P_{mid}, P_{in}, R_{in}, R_{mid}}{\mathrm{Argmax}} C \quad (5)$$

Subject to $0 \leq R_{in} \leq R_{mid} \leq R$, $P_{out} + P_{mid} + P_{in} = P$ That is, "$P_{mid}$," "$P_{in}$," "$R_{in}$," and "$R_{mid}$" are determined to maximize "C." In Equation 5, "$P_{mid}$" represents power allocated to MSs located in the second region, and "$P_{in}$" represents power allocated to MSs located in the first region. Also, "$R_{in}$" represents the cell radius of the first region, and "$R_{mid}$" represents the cell radius of the second region. When it is assumed that MSs are uniformly distributed, and each region allocates power to the same number of MSs, the following Equations are obtained because every region has the same dimensions;

$$R_{in} = \frac{1}{\sqrt{3}} R$$

and $$R_{mid} = \sqrt{\frac{2}{3}} R.$$

Here, the "C" may be defined by Equation 6 below.

$$C = W_{in} \int_0^{2\pi} \int_0^{R_{in}} C_{in}(r, \theta) p(r, \theta) r \, dr \, d\theta + \quad (6)$$

$$W_{mid} \int_0^{2\pi} \int_{R_{in}}^{R_{mid}} C_{mid}(r, \theta) p(r, \theta) r \, dr \, d\theta +$$

$$W_{out} \int_0^{2\pi} \int_{R_{mid}}^{R} C_{out}(r, \theta) p(r, \theta) r \, dr \, d\theta$$

$$= W_{in} \int_0^{2\pi} \int_0^{R_{in}} C_{in}(r, \theta) \frac{1}{\pi R_1^2} r \, dr \, d\theta +$$

$$W_{mid} \int_0^{2\pi} \int_{R_{in}}^{R_{mid}} C_{mid}(r, \theta) \frac{1}{\pi (R_{mid}^2 - R_{in}^2)} r \, dr \, d\theta +$$

$$W_{out} \int_0^{2\pi} \int_{R_{mid}}^{R} C_{out}(r, \theta) \frac{1}{\pi (R^2 - R_{mid}^2)} r \, dr \, d\theta$$

In Equation 6, "$C_{out}$" represents a capacity of the third region, "$C_{mid}$" represents a capacity of the second region, and "$C_{in}$" represents a capacity of the first region. Also, "$W_{out}$", "$W_{mid}$", and "$W_{in}$" are weight values for guaranteeing fairness among regions, and are adjusted according to each required rate.

Figure 7:
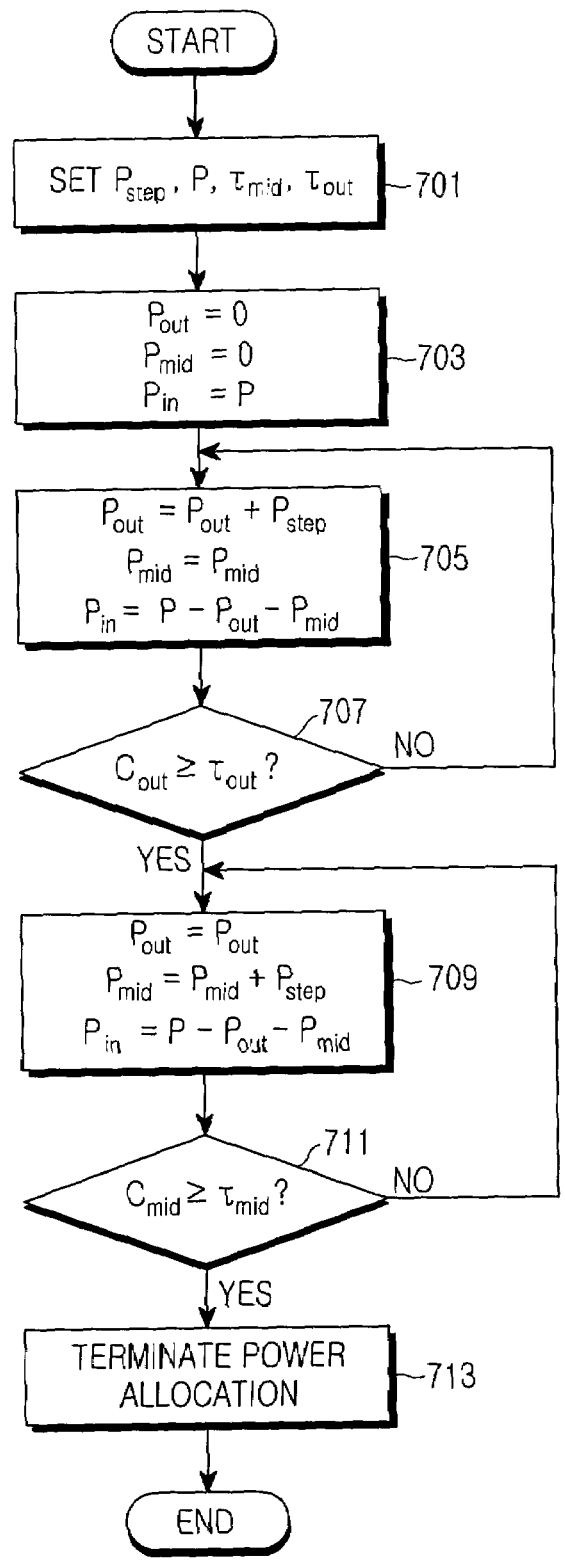
FIG. 7 is a flowchart illustrating a procedure in which a base station allocates power to MSs located in each region in a communication system according to an exemplary embodiment of the present invention.

FIG. 7 is a flowchart illustrating a procedure in which a BS allocates power to MSs located in the first, second and third regions.

In step 701, the BS sets "$P_{step}$," representing an amount of change in power, "P," representing the total power of a cell, "$\tau_{mid}$," representing a capacity required in the second region, and "$\tau_{out}$," representing a capacity required in the third region, and then proceeds to step 703. In step 703, the BS initializes power "$P_{out}$" for MSs located in the third region and power "$P_{mid}$" for MSs located in the second region to zero, respectively, initializes power "$P_{in}$" for MSs located in the first region to the total power "P" of a cell, and then proceeds to step 705. In step 705, the BS increases the power "$P_{out}$" for the third region by an increment of "$P_{step}$," subtracts the increment of the power "$P_{out}$" from the power for the first region, and then proceeds to step 707. In step 707, the BS calculates the capacity "$C_{out}$" of the third region according to power of each region, and determines if the calculated capacity "$C_{out}$" is equal to or greater than the capacity "$\tau_{out}$" required in the third region through a comparison with the capacity "$\tau_{out}$."

When it is determined that the capacity "$C_{out}$" of the third region is less than the capacity "$\tau_{out}$" required in the third region as a result of the comparison, the BS returns to step 705. In contrast, when it is determined that the capacity "$C_{out}$" of the third region is equal to or greater than the capacity "$\tau_{out}$" required in the third region as a result of the comparison, the BS proceeds to step 709. In step 709, the BS increases the power "$P_{mid}$" for the second region by the increment of "$P_{step}$," subtracts the increment of the power "$P_{mid}$" from the power for the first region, and then proceeds to step 711. In step 711, the BS calculates the capacity "$C_{mid}$" of the second region according to power of each region, and determines if the calculated capacity "$C_{out}$" is equal to or greater than the capacity "$\tau_{mid}$" required in the second region through a comparison with the capacity "$\tau_{mid}$."

When it is determined that the capacity "$C_{mid}$" of the second region is less than the capacity "$\tau_{mid}$" required in the second region as a result of the comparison, the BS returns to step 709. In contrast, when it is determined that the capacity "$C_{mid}$" of the second region is equal to or greater than the capacity "$\tau_{mid}$" required in the second region as a result of the comparison, the BS terminates the power allocation operation in step 713.

Figure 8:
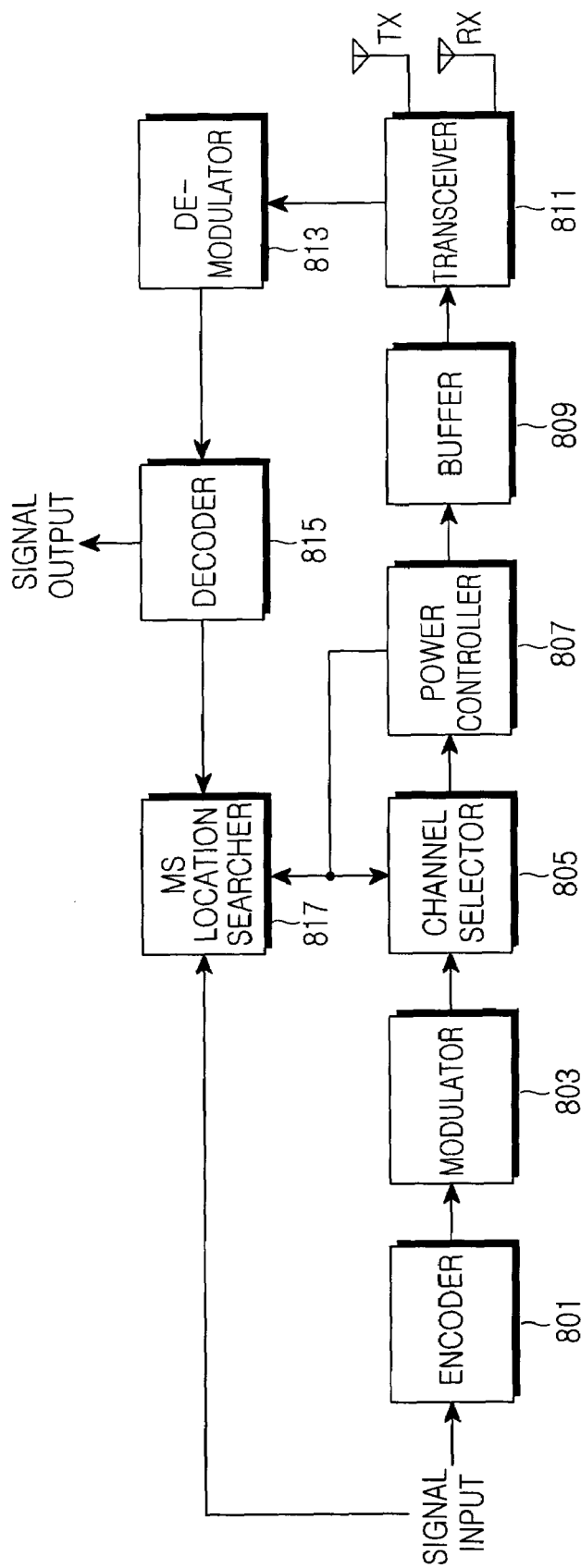
FIG. 8 is a block diagram illustrating the configuration of a transmitting apparatus according to an exemplary embodiment of the present invention.

FIG. 8 is a block diagram illustrating the configuration of a transmitting apparatus in a BS according to an exemplary embodiment of the present invention.

The transmitting apparatus includes an encoder 801, a modulator 803, a channel selector 805, a power controller 807, a buffer 809, a transceiver 811, a demodulator 813, a decoder 815, and an MS location searcher 817.

A signal to be transmitted to an MS from the signal transmitting apparatus is input to the encoder 801. The encoder 801 encodes the signal according to a preset encoding scheme, e.g. according to one scheme among a quadrature amplitude modulation (QAM) scheme, a binary phase shift key (BPSK) scheme, a quadrature phase shift key (QPSK) scheme, and the like, and then outputs the encoded signal to the modulator 803. The modulator 803 receives the signal output from the encoder 801, modulates the received signal according to a preset modulation scheme, and then outputs the modulated signal to the channel selector 805.

The channel selector 805 receives the modulated signal output from the modulator 803, determines which region, among the first, second and third regions the MS is located in based on location information on the MS stored in the MS location searcher 817, selects the determined region, and then outputs information representing the selected region to the power controller 807, together with the signal output from the modulator 803. The MS location searcher 817 stores the location information of the MS, which is identified through a periodic signal update or other means. For example, the MS location searcher 817 may determine that the MS is located in the first region when the SINR of the MS is equal to or smaller than a first threshold value, determine that the MS is located in the second region when the SINR of the MS is larger than the first threshold value and is equal to or less than a second threshold value, and determine that the MS is located in the third region when the SINR of the MS is larger than the second threshold value. Consequently, the information representing the selected region corresponds to information about a frequency band corresponding to the selected region.

The power controller 807 allocates power for the MS to the signal received from the channel selector 805 according to the region selected by the channel selector 805, and outputs the signal to the buffer 809. The buffer 809 receives and stores the signal output from the power controller 807, and then outputs the stored signal to the transceiver 811, together with other region information representing another region using the same frequency bandwidth as the region selected by the channel selector 805. Then, the transceiver 811 transmits the signal received from the buffer 809 by a frequency band corresponding to the selected region.

Meanwhile, when a received signal arrives at the transceiver 811, the transceiver 811 receives and outputs the received signal to the demodulator 813. The demodulator 813 receives and demodulates the signal output from the transceiver 811 according to a preset modulation scheme, and then outputs the demodulated signal to the decoder 815. The decoder 815 receives and decodes the signal output from the demodulator 813 according to a preset decoding scheme, and then outputs the decoded signal.

Figure 9:
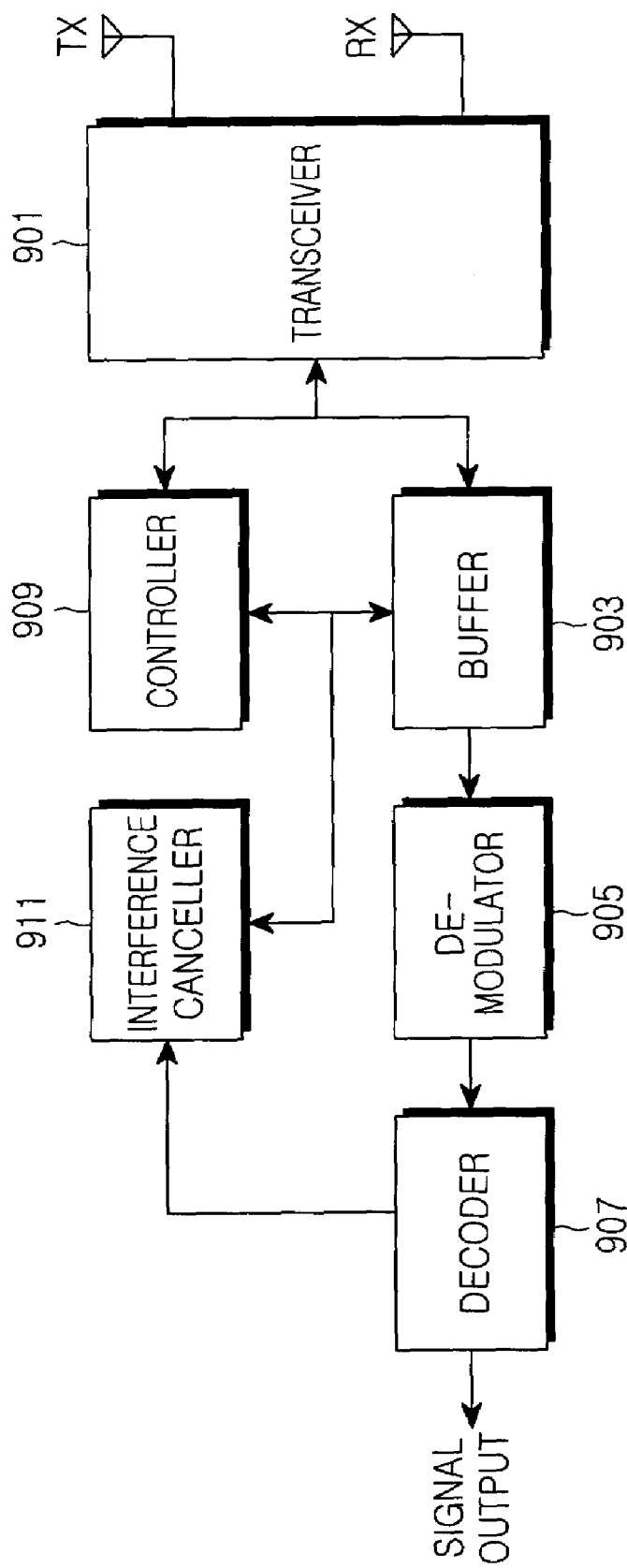
FIG. 9 is a block diagram illustrating the configuration of a receiving apparatus according to an exemplary embodiment of the present invention.

FIG. 9 is a block diagram illustrating the configuration of a receiving apparatus in an MS according to an exemplary embodiment of the present invention.

The receiving apparatus includes a transceiver 901, a buffer 903, a demodulator 905, a decoder 907, a controller 909, and an interference canceller 911.

The transceiver 901 outputs a signal, which has been received from a BS, to the buffer 903. The buffer 903 buffers the signal received from the transceiver 901, and transfers the buffered signal to the interference canceller 911 or the demodulator 905 according to the control of the controller 909. The controller 909 determines which region the MS is located in according to a control signal received from the BS, or by other means. When it is determined that the MS is located in the third or second region, the controller 909 controls the buffer 903 to output the buffered signal to the demodulator 905. In contrast, when it is determined that the MS is located in the first region, the controller 909 controls the buffer 903 to output the buffered signal to the interference canceller 911. The interference canceller 911 receives the signal output from the buffer 903, cancels second and third region signals having the same frequency band as that of the first region in which the MS is located, from the input signal, and then returns the remaining signal (i.e. a first region signal) to the buffer 903.

The buffer 903 outputs the first region signal, which has been received from the interference canceller 911, to the demodulator 905. The demodulator 905 demodulates the signal received from the buffer 903 according to a preset demodulation scheme, and then outputs the demodulated signal to the decoder 907. The decoder 907 receives and decodes the signal output from the demodulator 905 according to a preset decoding scheme, and then outputs the decoded signal.

As described above, the present invention proposes a new reuse scheme to address the problem of low bandwidth use efficiency in the soft frequency reuse scheme, which is used for resource allocation in a communication system. Thereby it is possible to increase the bandwidth use efficiency by allocating frequency bandwidths and power applied to the frequency bandwidths according to the reuse scheme of the present invention.

While the present invention has been shown and described with reference to certain exemplary embodiments thereof, it will be understood by those skilled in the art that various changes in form and details may be made therein without departing from the spirit and scope of the invention as defined by the appended claims and their equivalents. Accordingly, the scope of the invention is not to be limited by the above exemplary embodiments but by the appended claims and their equivalents.

What is claimed is:

1. A method for allocating resources by a base station in a communication system, the method comprising:
   determining if a mobile station within a cell is located in one of a first region corresponding to a cell center, a third region corresponding to a cell edge, and a second region corresponding to an area between the first and third regions;
   allocating frequency resources within an entire frequency band to the mobile station when the mobile station is located in the first region, wherein the entire frequency band comprises at least a first frequency band and a second frequency band;
   allocating frequency resources within the first frequency band to the mobile station when the mobile station is located in the third region;
   allocating frequency resources within the second frequency band to the mobile station when the mobile station is located in the second region; and
   allocating transmission power for the mobile station to one of a first transmission power allocated for the first region, a second transmission power allocated for the second region, and a third transmission power allocated for the third region, according to a region in which the mobile station is located,
   wherein the first transmission power corresponds to a remainder obtained by excluding the second transmission power and third transmission power from a total transmission power allocated to the cell, and the third transmission power is greater than the second transmission power.

2. The method as claimed in claim 1, further comprising, before the allocating of the transmission power:
   initializing the first transmission power for the first region to the total transmission power, and initializing the second transmission power and the third power for the second and third regions to zero;
   determining the third transmission power according to a preset power change amount and a power capacity required in the third region;
   determining the second transmission power according to the power change amount and a power capacity required in the second region, when the third transmission power has been determined; and
   determining the first transmission power to be a remainder which is obtained by excluding the second transmission power and the third transmission power from the total transmission power.

3. The method as claimed in claim 2, wherein, in the determining of the third transmission power, the third transmission power is repeatedly increased by the preset power change amount until a power capacity of the third region reaches a power capacity required in the third region.

4. The method as claimed in claim 3, wherein, in the determining of the second transmission power, when the power capacity of the third region has reached a power capacity required in the third region, the second transmission power is repeatedly increased by the preset power change amount until a power capacity of the second region reaches a power capacity required in the second region.

5. The method as claimed in claim 1, wherein the allocated first frequency band is not the same frequency band in every cell.

6. The method as claimed in claim 1, wherein the allocated second frequency band is a frequency band which remains after exclusion of the first frequency band from the entire frequency band.

7. A method for allocating resources for a mobile station in a communication system, the method comprising:
   determining if the mobile station is located in a first region corresponding to one of a cell center, a third region corresponding to a cell edge, and a second region corresponding to an area between the first and third regions, within a cell;

receiving a signal from a base station through frequency resources allocated within an entire frequency band when the mobile station is located in the first region, wherein the entire frequency band comprises at least a first frequency band and a second frequency band;

receiving a signal from the base station through frequency resources allocated within the first frequency band when the mobile station is located in the third region; and receiving a signal from the base station through frequency resources allocated within the second frequency band when the mobile station is located in the second region, wherein transmission power for the mobile station is allocated to one of a first transmission power allocated for the first region, a second transmission power allocated for the second region, and a third transmission power allocated for the third region, according to a region in which the mobile station is located, in which the first transmission power corresponds to a remainder obtained by excluding the second transmission power and third transmission power from a total transmission power allocated to the cell, and the third transmission power is greater than the second transmission power.

8. The method as claimed in claim 7, wherein the receiving of the signal when the mobile station is located in the first region comprises:

detecting second and third region signals of the second and third regions; and detecting a first region signal of the first region by canceling the second and third region signals from signals received from the base station.

9. The method as claimed in claim 7, wherein the allocated first frequency band is not the same frequency band in every cell.

10. The method as claimed in claim 7, wherein the allocated second frequency band is a frequency band which remains after exclusion of the first frequency band from the entire frequency band.

11. An apparatus for allocating resources in a communication system, the apparatus comprising:

a location searcher for determining if a mobile station within a cell is located in one of a first region corresponding to a cell center, a third region corresponding to a cell edge, and a second region corresponding to an area between the first and third regions;

a channel selector for allocating frequency resources within an entire frequency band to the mobile station when the mobile station is located in the first region, allocating frequency resources within a first frequency band to the mobile station when the mobile station is located in the third region, and allocating frequency resources within a second frequency band to the mobile station when the mobile station is located in the second region, wherein the entire frequency band comprises at least the first frequency band and the second frequency band; and a power controller for allocating transmission power for the mobile station to one of a first transmission power allocated for the first region, a second transmission power allocated for the second region, and a third transmission power allocated for the third region, according to a region in which the mobile station is located, wherein the first transmission power corresponds to a remainder obtained by excluding the second transmission power and third transmission power from a total transmission power allocated to the cell, and the third transmission power is greater than the second transmission power.

12. The apparatus as claimed in claim 11, wherein, before allocating the transmission power, the power controller initializes the first transmission power for the first region to the total transmission power, initializes the second transmission power and the third transmission power for the second and third regions to zero, determines the third transmission power according to a preset power change amount and a power capacity required in the third region, determines the second transmission power according to the power change amount and a power capacity required in the second region, when the third transmission power has been determined, and determines the first transmission power to be a remainder which is obtained by excluding the second transmission power and the third transmission power from the total transmission power.

13. The apparatus as claimed in claim 12, wherein the power controller repeatedly increases the third transmission power by the preset power change amount until a power capacity of the third region reaches a power capacity required in the third region.

14. The apparatus as claimed in claim 13, wherein, when the power capacity of the third region has reached a power capacity required in the third region, the power controller repeatedly increases the second transmission power by the preset power change amount until a power capacity of the second region reaches a power capacity required in the second region.

15. The method as claimed in claim 11, wherein the allocated first frequency band is not the same frequency band in every cell.

16. The method as claimed in claim 11, wherein the allocated second frequency band is a frequency band which remains after exclusion of the first frequency band from the entire frequency band.

17. An apparatus for allocating resources in a communication system, the apparatus comprising:

a controller for determining if the mobile station is located in one of a first region corresponding to a cell center, a third region corresponding to a cell edge, and a second region corresponding to an area between the first and third regions, within a cell; and a receiver for receiving a signal from a base station through frequency resources allocated within an entire frequency band when the mobile station is located in the first region, through frequency resources allocated within a first frequency band when the mobile station is located in the third region, and through frequency resources allocated within a second frequency band when the mobile station is located in the second region, wherein the entire frequency band comprises at least the first frequency band and the second frequency band, wherein transmission power for the mobile station is allocated to one of a first transmission power allocated for the first region, a second transmission power allocated for the second region, and a third transmission power allocated for the third region, according to a region in which the mobile station is located, in which the first transmission power corresponds to a remainder obtained by excluding the second transmission power and third transmission power from total transmission power allocated to the cell, and the third power is greater than the second transmission power.

18. The apparatus as claimed in claim 17, wherein, when the mobile station is located in the first region, the receiver detects second and third region signals of the second and third regions, and detects a first region signal of the first region by canceling the second and third region signals from signals received from the base station.

19. The method as claimed in claim 17, wherein the allocated first frequency band is not the same frequency band in every cell.

20. The method as claimed in claim 17, wherein the allocated second frequency band is a frequency band which remains after exclusion of the first frequency band from the entire frequency band.

\* \* \* \* \*